No. 797,300. PATENTED AUG. 15, 1905.
W. A. LOXTERMAN.
CLOTHES LINE REEL.
APPLICATION FILED NOV. 10, 1902.
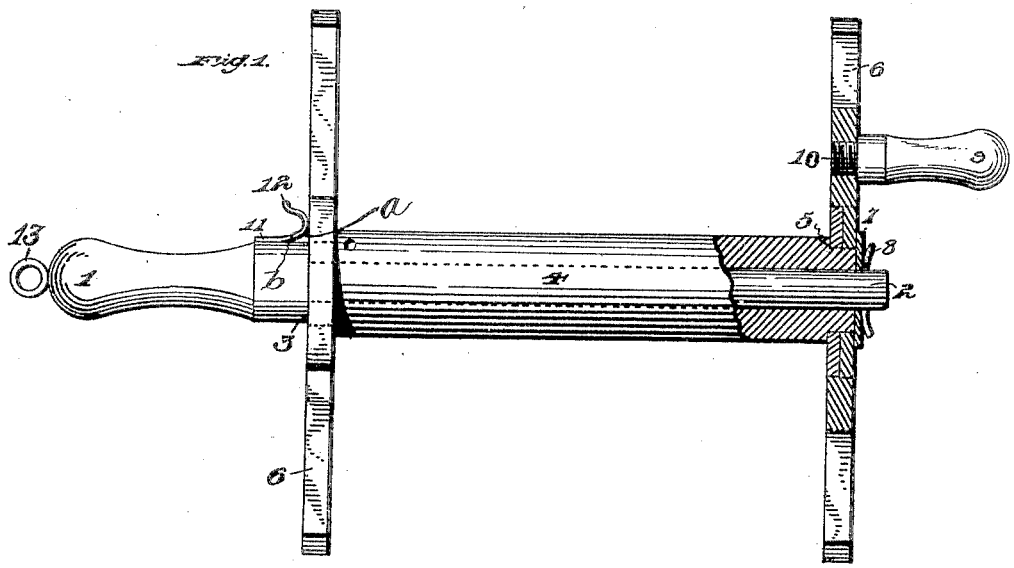
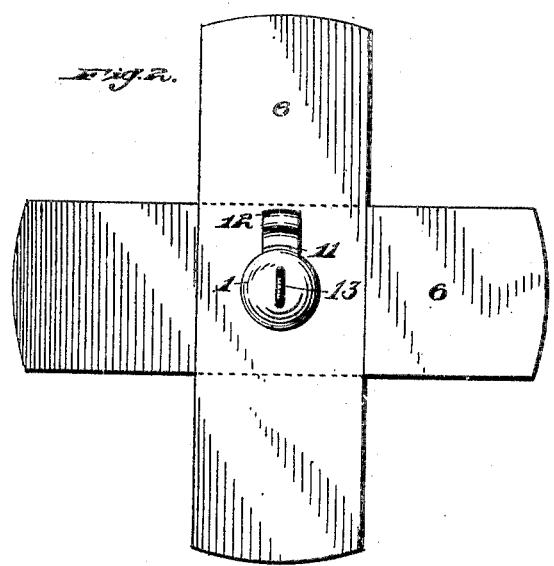

UNITED STATES PATENT OFFICE.

WALTER A. LOXTERMAN, OF PITTSBURG, PENNSYLVANIA.

CLOTHES-LINE REEL.

No. 797,300. Specification of Letters Patent. Patented Aug. 15, 1905.

Application filed November 10, 1902. Serial No. 130,633.

*To all whom it may concern:*

Be it known that I, WALTER A. LOXTERMAN, a citizen of the United States of America, residing at Pittsburg, in the county of Allegheny and State of Pennsylvania, have invented certain new and useful Improvements in Clothes-Line Reels, of which the following is a specification.

My invention relates to an improvement in clothes-line reels.

The object of my invention is to provide a hand-reel of the character described that may be readily taken apart and conveniently packed for shipping.

Another feature resides in a friction-brake adapted to control the unwinding of the line from the reel.

Finally, the object of the invention is to provide a device of the character described that will be strong, durable, and efficient, and simple and inexpensive to manufacture, and one in which the several parts will not be liable to get out of working order.

With the above and other objects in view the invention consists in the novel details of construction, a preferable embodiment of which is described in the specification and illustrated in the drawings, wherein—

Figure 1 is a side elevation view of the reel, partly in section; and Fig. 2 is an end view of the same.

In the drawings the numeral 1 designates the handle, which is of wood, and, in fact, the greater part of the device is constructed of wood, although it may be made of any other material. The handle 1 is provided with an integral shaft 2, somewhat smaller than the handle, so that a shoulder 3 is formed, against which the end of the hub 4, loosely mounted on the shaft 2, is adapted to abut. The hub 4 is formed with reduced ends 5, which are adapted to fit tightly in apertures formed in arms 6. The arms 6 are secured to each other by "halved-together" joints at their intersecting portions, which causes them to lie in the same plane, as clearly shown in the sectional portion of Fig. 1. The hub 4 is held loosely on the shaft 2 by a washer 7 and a pin 8, which may be readily removed that the parts may be separated. On one of the arms 6 I provide a handle 9, formed with a screw-threaded shank 10, by which it is screwed into the arm.

In order to form a brake for the reel, I provide a spring 11, having one end secured to the handle, the said spring having an elevated curved portion $a$ bearing against a reel-arm, and the said spring terminates in a finger-bearing portion 12, which can be manipulated by the operator to press the spring into or out of engagement with the arm. The spring may also be pressed into engagement with the arm to increase the friction by pressing the spring at the point $b$.

When it is desired to string a line from one place to another, which line has been previously wound upon the reel, the outer or free end of the line is fastened to the starting-point, and the operator walking along and carrying the reel by the handle 1 controls the unwinding of the line by the friction-brake 11, and thus prevents the line from sagging and falling upon the ground, thereby becoming soiled and dirtying the clothes hung upon the line. When the end of the distance which the line is to be stretched is reached, the line is drawn taut and fastened and the reel hung upon a nail or the like by the eye 13, provided on the end of the handle 1. To wind a line upon the reel, the handle 1 is held in one hand and the reel is revolved by the handle 9 with the other hand and the friction-brake manipulated by the finger portion 12.

To facilitate the packing and shipping of the reel, it is so constructed that it may be readily taken apart. To separate the parts, the pin 8 and the washer 7 are removed from the end of the shaft 2, then the hub 4 is slipped off the shaft and the arms 6 are pulled off the ends 5 of the hub and taken apart at their intersecting portions, and, finally, the handle 9 is unscrewed from the arm 6. It will thus be seen that several parts may be placed in a comparatively small space and conveniently transported from place to place.

I do not wish to limit myself to the exact details of construction and operation herein set forth, as I may make various changes without departing from the spirit of my invention.

Having thus fully described my invention, what I claim as new, and desire to secure by Letters Patent, is—

In a device of the character described, the combination with a handle provided with carrying and supporting means of a clothes-line reel, of a reel mounted to rotate axially of the handle at the inner end of said handle, a brake adapted to be controlled by a digit of a hand having the handle while carrying the reel, the said brake comprising a strip having an end anchored to the handle and disposed longitudinally with relation to the handle, the free end of said strip being bent back to overhang the anchored portion, the outer curved surface coacting with the reel and the free end of the strip forming a bearing, whereby the spring may be drawn from engagement with the reel, substantially as described.

In testimony whereof I affix my signature, in the presence of two witnesses, this 4th day of November, 1902.

WALTER A. LOXTERMAN.

Witnesses:
JOHN NOLAND,
M. B. SCHLEY.